US012694188B2

(12) United States Patent
Patel Jignesh et al.

(10) Patent No.: US 12,694,188 B2
(45) Date of Patent: Jul. 28, 2026

(54) PARAMETERIZED CELL WITH MULTIPLE LAYOUT CONFIGURATION OPTIONS

(71) Applicant: GlobalFoundries U.S. Inc., Malta, NY (US)

(72) Inventors: Manubhai Patel Jignesh, Milpitas, CA (US); James A. Culp, New Paltz, NY (US); Bradley A. Orner, Ben Lomond, CA (US); Haritez Narisetty, Fremont, CA (US)

(73) Assignee: GlobalFoundries U.S. Inc., Malta, NY (US)

( * ) Notice: Subject to any disclaimer, the term of this patent is extended or adjusted under 35 U.S.C. 154(b) by 751 days.

(21) Appl. No.: 18/169,315

(22) Filed: Feb. 15, 2023

(65) Prior Publication Data

US 2024/0273275 A1　Aug. 15, 2024

(51) Int. Cl.
　　*G06F 30/392*　　(2020.01)
　　*G06F 30/31*　　(2020.01)
　　*G06F 111/20*　　(2020.01)

(52) U.S. Cl.
　　CPC ............ *G06F 30/392* (2020.01); *G06F 30/31* (2020.01); *G06F 2111/20* (2020.01)

(58) Field of Classification Search
　　USPC ....................................................... 716/119
　　See application file for complete search history.

(56) References Cited

U.S. PATENT DOCUMENTS

| | | | | |
|---|---|---|---|---|
| 10,719,657 B1 * | 7/2020 | Feuillette | .............. | G06F 30/398 |
| 11,809,797 B1 * | 11/2023 | Rittman | ................ | G06F 30/337 |
| 2004/0155362 A1 * | 8/2004 | Cho | ....................... | H01L 21/565 |
| | | | | 438/109 |

(Continued)

FOREIGN PATENT DOCUMENTS

| | | | | | |
|---|---|---|---|---|---|
| CN | 114896920 A | * | 8/2022 | ............. | G06F 30/33 |
| CN | 114944386 A | * | 8/2022 | ........... | G06F 30/392 |

OTHER PUBLICATIONS

Billoint et al., "Merging PDKs to build a design environment for 3D circuits: methodology, challenges and limitations," 2019 IEEE International 3D Systems Integration Conference (3DIC), 5 pages.

(Continued)

*Primary Examiner* — Mohammed Alam
(74) *Attorney, Agent, or Firm* — Ramakrishnan Parthasarathy; Hoffman Warnick LLC

(57) ABSTRACT

Disclosed are a process design kit (PDK) product and also a design system and a design method that employ the PDK product to layout IC designs including 3D IC designs. The PDK product includes a storage medium and a PDK, including a library of cells, stored thereon. The cells can include parameterized cells (pcells) representing various IC components. The pcells are parameter-customizable and one or more of the pcells are also layout configuration-customizable. Each parameter and layout configuration-customizable pcell includes customization script, which is executable by a processor in response to inputs specific to that pcell and which can cause the processor to place an instance of that pcell with customized parameters in a 3D IC layout according to a selected layout configuration option (e.g., a single-chip layout configuration option or a multi-chip layout configuration option).

20 Claims, 12 Drawing Sheets

(56) References Cited

U.S. PATENT DOCUMENTS

2014/0151882 A1\*   6/2014   Morimoto ........... H10D 84/038
                                                        438/109

OTHER PUBLICATIONS

Cibrario et al., "A 3D Process Design Kit Generator based on Customizable 3D Layout Design Environment," 2013 EEE, 5 pages.

Stander et al., "A novel, flexible Pcell-driven design flow for mm-wave on-chip passives," Dec. 2015 IEEE International Microwave and RF Conference (IMaRC), 5 pages.

Park et al., "Pseudo-3D Approaches for Commercial-Grade RTL-to-GDS Tool Flow Targeting Monolithic 3D ICs," Session 2: Breaking New Ground: From Carbon Nanotubes to Packaging, ISPD '20, Sep. 20-23, 2020, Proceedings published Mar. 29, 2020, 8 pages.

\* cited by examiner

100

101

102(1)

110

111

PC1          SC1

PC2           ⋮

PC3          SCm

PC4

⋮

PCn

112

Display(s)
152

Input Device(s)
151

PROCESSOR(s)
150

102(2)

EDA Tool(s)
120

3D IC Layout
130

1st Layout Section
131

2nd Layout Section
132

Final
1st Layout Section
141

Final
2nd Layout Section
142

300

| Pcells | IC Component Name |
|---|---|
| PC1 | FET #... |
| PC2 | RF Switch #... |
| PC3 | Multi-Finger Capacitor #... |
| PC4 | Inductor #... |
| . . . | |
| PC*n* | ... |

400

500

600

PC3 CUSTOMIZATION OPTIONS

PC3 Parameter Options

| |
|---|
| Number Of Interlocking Conductor Fingers |
| Conductor Finger Thickness |
| Capacitor Dielectric Thickness |
| .<br>.<br>. |

PC3 Layout Configuration Options

| |
|---|
| 2D Layout |
| 3D Layout Including:<br>(1) A 1st Layout Section for a 1st Chip; and<br>(2) A 2nd Layout Section for a 2nd Chip |

700

First Wafer                                    Second Wafer

PARAMETERIZED CELL WITH MULTIPLE LAYOUT CONFIGURATION OPTIONS

BACKGROUND

The present disclosure relates to integrated circuit (IC) design and, more particularly, to embodiments of an IC design system, method, and process design kit (PDK) product.

Factors considered in modern IC design include, but are not limited to, performance improvement, size scaling, and power consumption. Oftentimes, however, there is a tradeoff between these factors. For example, a radio frequency (RF) switch can include a stack of series-connected field effect transistors (FETs), where each FET in the stack has a gate (referred to herein as a gate finger) connected to a common gate node. RF switch performance can be improved by increasing the number of stacked FETs within the RF switch. However, increasing the number of stacked FETs may increase the area occupied by the RF switch in the layout.

SUMMARY

Disclosed herein are embodiments of a design system. The system can include a computer-readable storage medium and a processor in communication with the storage medium. The storage medium can store a library of cells including parameterized cells. At least one of the parameterized cells can represent a circuit component with multiple layout configuration options including a single-chip layout configuration option and a multi-chip layout configuration option. The processor can, in response to inputs that are received by the processor (e.g., from a user via a graphic user interface (GUI)) and that are specific to the parameterized cell, place an instance of the parameterized cell in a layout for a three-dimensional (3D) IC according to one of the multiple layout configuration options (e.g., as indicated by the inputs).

Also disclosed herein are embodiments of a design method. The method can include receiving, by a processor, inputs (e.g., from a user via a GUI) that are specific to one parameterized cell of multiple parameterized cells in a library of cells stored in a computer-readable storage medium. This parameterized cell can represent a circuit component with multiple layout configuration options including a single-chip layout configuration option and a multi-chip layout configuration option. The method can further include placing, by the processor in response to the inputs, an instance of the parameterized cell in a layout for a 3D IC according to one of the multiple layout configuration options (e.g., as indicated by the inputs).

Also disclosed herein are embodiments of a product (referred to herein as a design kit (PDK) product). The PDK product can include computer-readable storage medium, which includes a PDK embodied therewith (i.e., stored thereon). The PDK can include a library of cells including parameterized cells. At least one parameterized cell of the parameterized cells can represent a circuit component with multiple layout configuration options including a single-chip layout configuration option and a multi-chip layout configuration option. The parameterized cell can have customization script, which is executable by a processor to cause the processor to perform a method. This method can include, in response to inputs that are received by the processor (e.g., from a user via a GUI) and that are specific to the parameterized cell, placing an instance of the parameterized cell in a layout for a 3D IC, according to one of the multiple layout configuration options (e.g., as indicated by the inputs).

BRIEF DESCRIPTION OF THE DRAWINGS

The present disclosure will be better understood from the following detailed description with reference to the drawings, which are not necessarily drawn to scale and in which.

DETAILED DESCRIPTION

Figure 1:
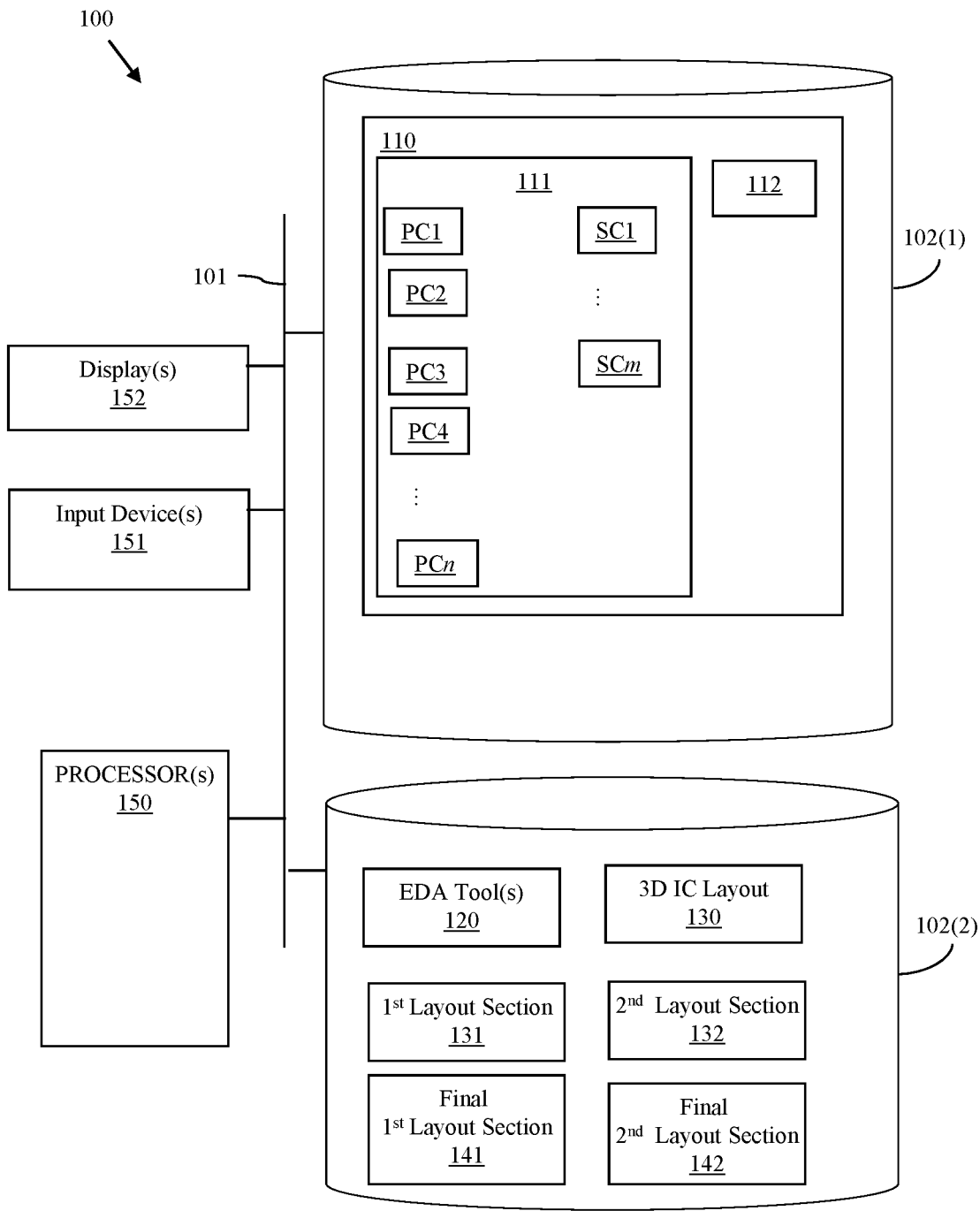
FIG. 1 is a schematic drawing illustrating disclosed embodiments of a design system

As mentioned above, factors considered in modern IC design include, but are not limited to, performance improvement, size scaling, and power consumption. Oftentimes, however, there is a tradeoff between these factors. For example, an RF switch can include a stack of series-connected FETs, where each FET in the stack has a gate (referred to herein as a gate finger) connected to a common gate node. RF switch performance can be improved by increasing the number of stacked FETs. However, increasing the number of stacked FETs results in a corresponding increase in the area consumed by the RF switch in the layout. Three-dimensional (3D) ICs, which include two or more chips electrically connected and stacked vertically with the various IC components of a given IC design being divided up amongst the chips, have been developed to reduce two-dimensional area consumption with just a slight increase in chip package thickness. However, currently available automated design techniques for 3D ICs still only allow for any given IC component (e.g., an RF switch) represented by a cell to be placed in the layout section for one of the chips in the 3D IC, so increasing the number of stacked FETs still results in two-dimensional area consumption.

In view of the foregoing, disclosed herein are embodiments of a process design kit (PDK) product, embodiments of a design method employing the PDK product to layout 3D IC designs, and embodiments of a design system for implementing the design method. The PDK product can include a computer-readable storage medium and a PDK, including a library of cells, stored thereon. The cells can include parameterized cells (pcells) (also referred to in the art as template cells) for various IC components. The pcells can all be parameter-customizable and one or more of the pcells can also be layout configuration-customizable. Each parameter and layout configuration-customizable pcell can include a customization script, which is executable by a processor in response to inputs specific to the pcell and which can cause the processor to place an instance of the pcell with customized parameters in a 3D IC layout according to a selected layout configuration option (e.g., a single-chip layout configuration option or a multi-chip layout configuration option). For example, when inputs indicate a specific pcell that is parameter and layout configuration-customizable, selected parameter values for the specific pcell, and the single-chip layout configuration option for the specific pcell, the customization script can cause the processor to place an instance of the pcell with the customized parameters entirely in the layout section for one chip of multiple chips in the 3D IC. When the inputs indicate a specific pcell that is a parameter and layout configuration-customizable pcell, selected parameter values for the specific pcell, and the multi-chip layout configuration option for the specific pcell, the customization script can cause the processor to place different portions of an instance of the pcell with customized parameters in different layout sections for different chips, respectively, of the 3D IC.

Figure 2:
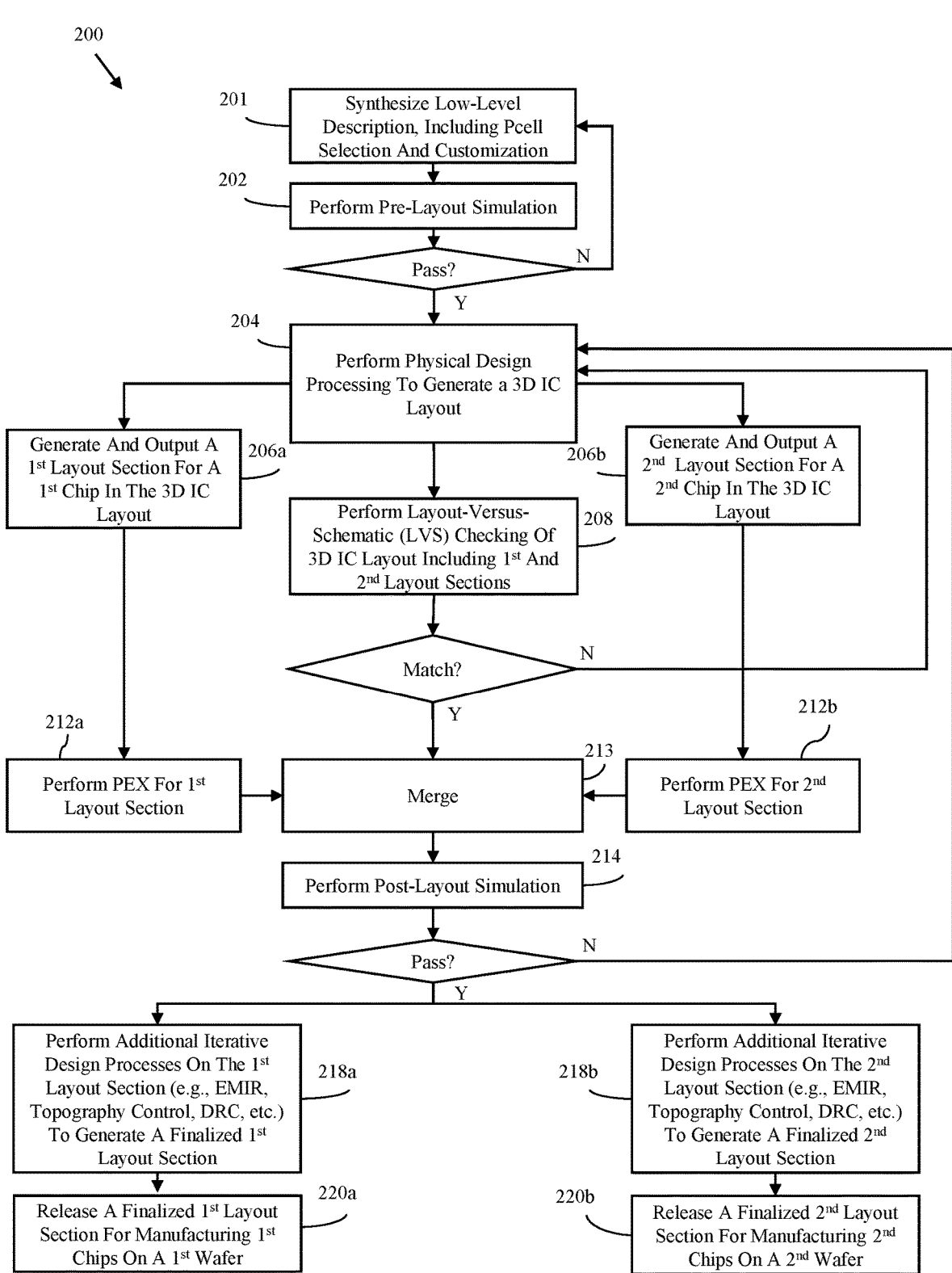
FIG. 2 is a flow diagram illustrating disclosed embodiments of a design method.

FIG. 1 is a schematic diagram illustrating a disclosed embodiment of a computer-aided design (CAD) system 100 employing the disclosed PDK product and FIG. 2 is a flow diagram illustrating a disclosed embodiment of a design method 200 implemented using the CAD system 100 and the PDK product.

The PDK product can be in the form of a computer-readable storage medium having a PDK 110 embodied therewith (e.g., stored thereon). The PDK 110 can be developed (e.g., by a specific semiconductor foundry) for use in conjunction with electronic design automation (EDA) tools 120 (also referred to herein as EDA programs or applications) to design ICs (including, but not limited to, 3D ICs) at a specific technology node (e.g., a specific technology node supported by the foundry). Those skilled in the art will recognize that a technology node (also referred to as a process node) is typically identified in nanometers (e.g., 22 nm, 14 nm, etc.), thereby indicating the size of the semiconductor features that can be formed on a semiconductor wafer at the foundry using the technology. The technology node may also indicate the type of wafer, such as a silicon-on-insulator (SOI) wafer. In some embodiments disclosed herein, the PDK 110 could be a PDK developed for one of multiple different radio frequency (RF) silicon-on-insulator (SOI) technology nodes. The PDK 110 can include various electronic files including PDK components 111-112. The PDK components can include, but are not limited to, a library 111 of cells (also referred to herein as library elements), as discussed in greater detail below. The PDK components can also include, for example, other design data and script files 112, including simulation models, symbols and technology files for the specific technology node, design rule decks and associated initialization scripts, etc., which are often employed by EDA tools 120 during IC design.

The CAD system 100 can include one or more processors 150, one or more displays 152 (e.g., one or more computer monitors), one or more input devices 151 (e.g., keyboards, touch screens, etc.) and one or more memories (e.g., see computer-readable storage mediums 102(1)-102(2). The various components of the CAD system including, but not limited to, the processor(s) 150, display(s) 152, input device(s) 151, and storage mediums(s) 102(1)-102(2) can be interconnected over a system bus 101, as illustrated, and/or over a wired or wireless network (not shown). Furthermore, the various components of the CAD system 100 can be co-located, as illustrated. Alternatively, the CAD system 100 could be a client-server system with a central server and multiple networked workstations. Alternatively, the CAD system 100 could be a distributed system whose components are distributed across different networked computers.

In the CAD system 100, a memory 102(1) (e.g., a computer-readable storage medium) can store the PDK 110. As mentioned above, the product (i.e., the PDK product) can be in the form of a computer-readable storage medium having the PDK 110 embodied therewith (e.g., stored thereon). The computer-readable storage medium 102(1) shown in FIG. 1 can be the PDK product itself (e.g., a disk, flash drive, portable hard drive, etc.), having the PDK 110 stored thereon and accessible by the processor(s) 150 through some interface (e.g., via a disk reader, USB port, or other interface, as appropriate). Alternatively, the PDK 110 could be uploaded into memory 102(1) from the PDK product through an interface.

The memory 102(2) (e.g., a computer-readable storage medium) can store EDA tools 120, which can be executed by the processor(s) 150 during different stages in a design flow for an IC (e.g., 3D IC). As mentioned above, the CAD system 100 can incorporate at least one processor 150. For example, the CAD system 100 can incorporate a single general purpose processor that, during IC design, executes each of the EDA tools as required to perform the various IC design processes. Alternatively, the CAD system 100 could incorporate two or more specialized processors and, during IC design, each specialized processor can execute one or more of the EDA tools as required to perform the various IC design processes. The EDA tools 120 can include, but are not limited to, a synthesis tool, a physical design tool (e.g., a cell selection, customization, and placement tool), simulation tool(s) (e.g., a simulation program with integrated circuit emphasis (SPICE) tool), a layout versus schematic (LVS) checking tool, a parasitic extraction (PEX) tool, an electromigration and voltage drop (EMIR) analysis tool, design rule checking (DRC) tool(s), etc. Such EDA tools are well known in the art and, thus, the details thereof have been omitted from this specification in order to allow the reader to focus on the salient aspects of the disclosed embodiments. In any case, during execution of the EDA tools 120 by the processor(s) 150, the PDK 110 and various inputs can be employed to aid in IC design and to ensure subsequent verification and validation of the resulting IC design. It should be noted that the inputs employed by one EDA tool can, for example, be received by a processor 150 from a user (e.g., via input device(s) 151 and using graphic user interface(s) (GUI(s)) of the respective EDA tool) or generated automatically, during the design flow, by one or more of the previously executed EDA tools.

As mentioned above, the PDK 110 can include a library 111 of cells (also referred to herein as library elements). The cells in the library 111 can represent specific IC components, respectively. A specific IC component represented by a given cell can be a device, such as a specific type of field effect transistor (FET) (e.g., a N-type metal oxide semiconductor (NMOS) FET configured for operation at a specific voltage, a P-type metal oxide semiconductor (PMOS) FET configured for operation at a specific voltage, etc.), a specific type of bipolar junction transistor (BJT), a specific type of capacitor, a specific type of inductor, a specific type of resistor, etc. Additionally, a specific IC component represented by a given cell can include multiple interconnected devices. For example, it could be a specific type of switch (e.g., a radio frequency (RF) switch that includes a stack of some specific type of FET), a logic gate, etc. In any case, each cell can include, for example, layout, schematic, symbol, abstract, and other logical or simulation views of the specific IC component it represents as well as functional definitions and timing, power, and noise information for each cell.

The cells in the library 111 can include parameterized cells (pcells) (e.g., see pcells PC1-PCn) and, optionally, standard cells (scells) (e.g., see scells SC1-SCm). It should be noted that, for each scell, the above-mentioned information can be provided for the specific IC component at issue given a fixed set of parameters (e.g., for a specific NMOS with a fixed channel width, a fixed channel length, etc.; for a specific PMOS with a fixed channel width, a fixed channel length, etc.; and so on) and further given a fixed single-chip layout configuration. Contrarily, all pcells PC1-PCn can be parameter-customizable and one or more of the pcells can also be layout-customizable such that the above-mentioned information is determined and provided (e.g., by a cell selection, customization, and placement tool) for a customized instance of the pcell. That is, such information is determined and provided based on user-selected parameter values for a given pcell and, for some of the pcells, based on a user-selected layout configuration for the pcell.

More specifically, referring to the flow diagram of FIG. 2, the design method for a 3D IC can begin with a high-level description of a 3D IC under design, which sets out the requirements for the IC using a hardware description language (HDL).

The design method can further include synthesizing (e.g., by a processor 150 executing a synthesis tool) this high-level description of the 3D IC into a low-level description of the IC (e.g., a gate-level netlist) (see process 201). Process 201 can include, for example, selection of cells from the library 111 and, in the case of pcells, parameter customization (e.g., user input or automatic input of parameter values for the specific IC component represented by the pcell) and, optionally, layout configuration-customization (e.g., user input or automatic input of a layout configuration selection).

Figure 3:
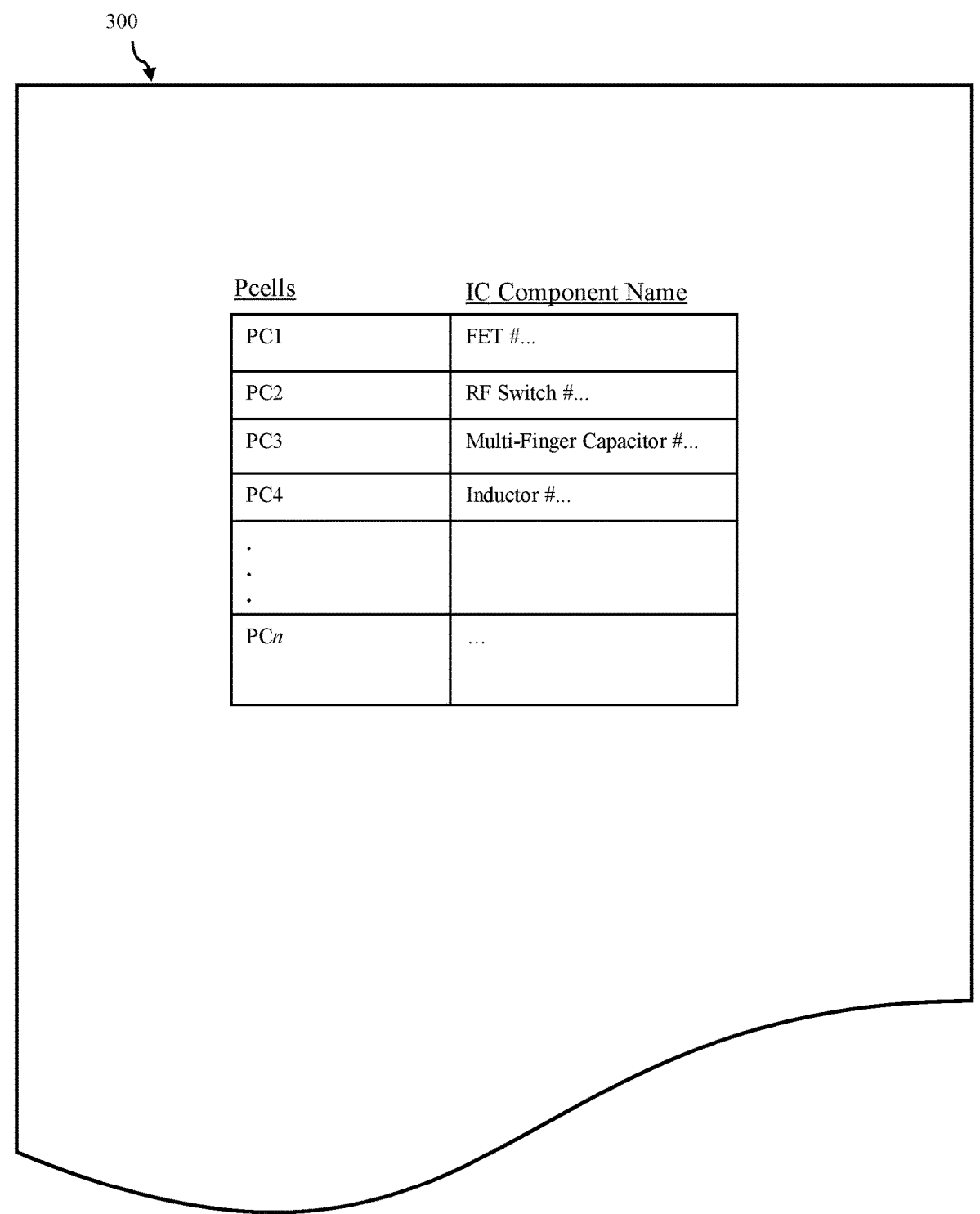
FIGS. 3-7 are exemplary screenshots generated by an GUI during IC design using the design system of FIG. 1 and/or the design method of FIG. 2.

For example, FIG. 3 illustrates an exemplary screenshot 300 from an exemplary GUI listing available pcells from the library 111 by name of the specific IC component they represent. Each line item (i.e., each pcell) can be selectable using the GUI. Once a given pcell is selected, the user can be provided with customization options, via the GUI, that allow the user to customize particular geometric parameters for that pcell and, optionally, that allow the user to customize the layout.

Figure 4:
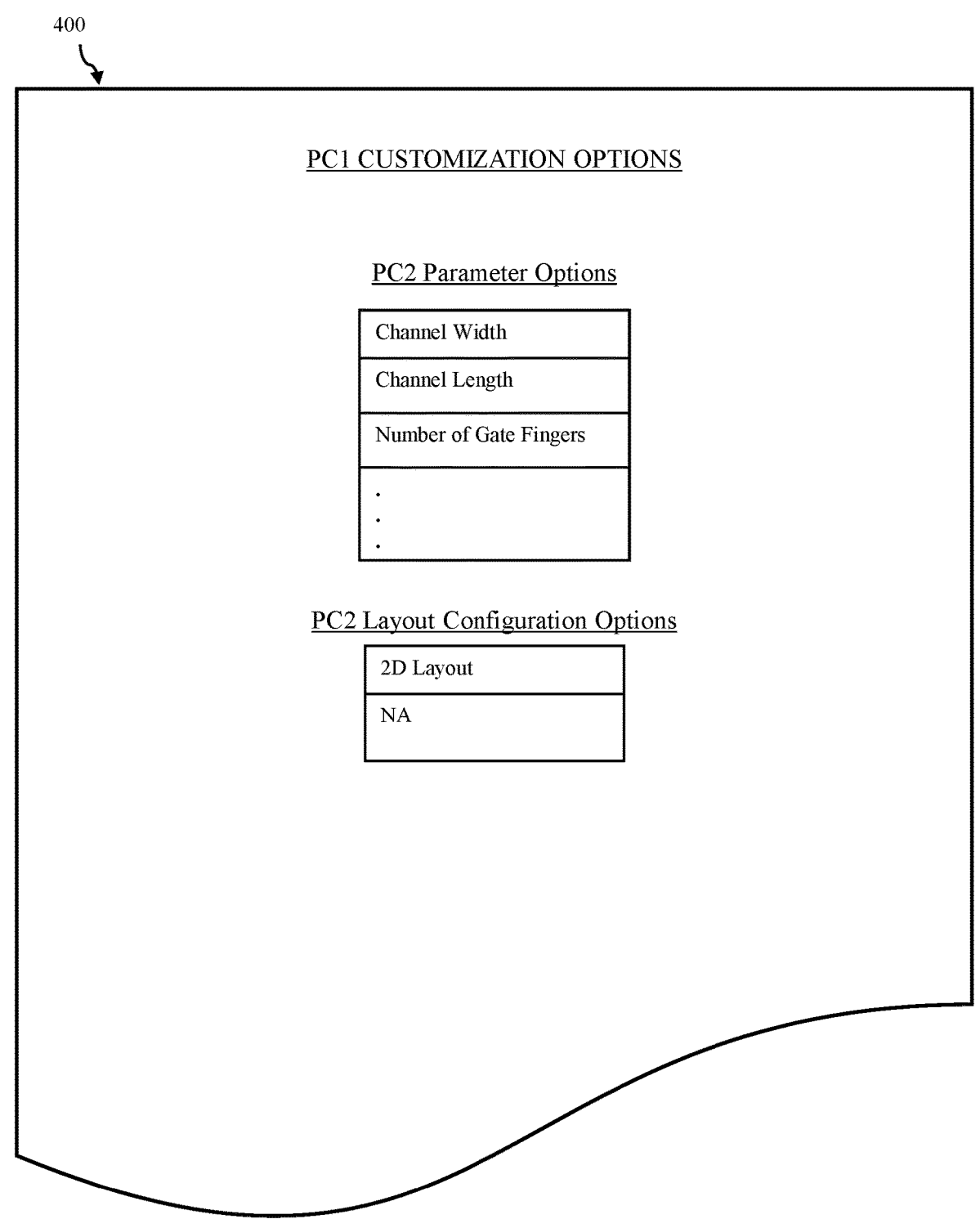

FIG. 4 is an exemplary screenshot 400 from an exemplary GUI following selection of PC1, which represents a specific type of FET (e.g., an NMOS, a PMOS, etc.) identified by some identifier (e.g., a number, name, etc.). The variable geometric parameters can include, but are not limited to, channel length, channel width, etc. Therefore, if multiple instances of the same FET PC1 are inserted into the layout for an IC design, different instances may have different combinations of channel length and/or channel width.

Figure 5:
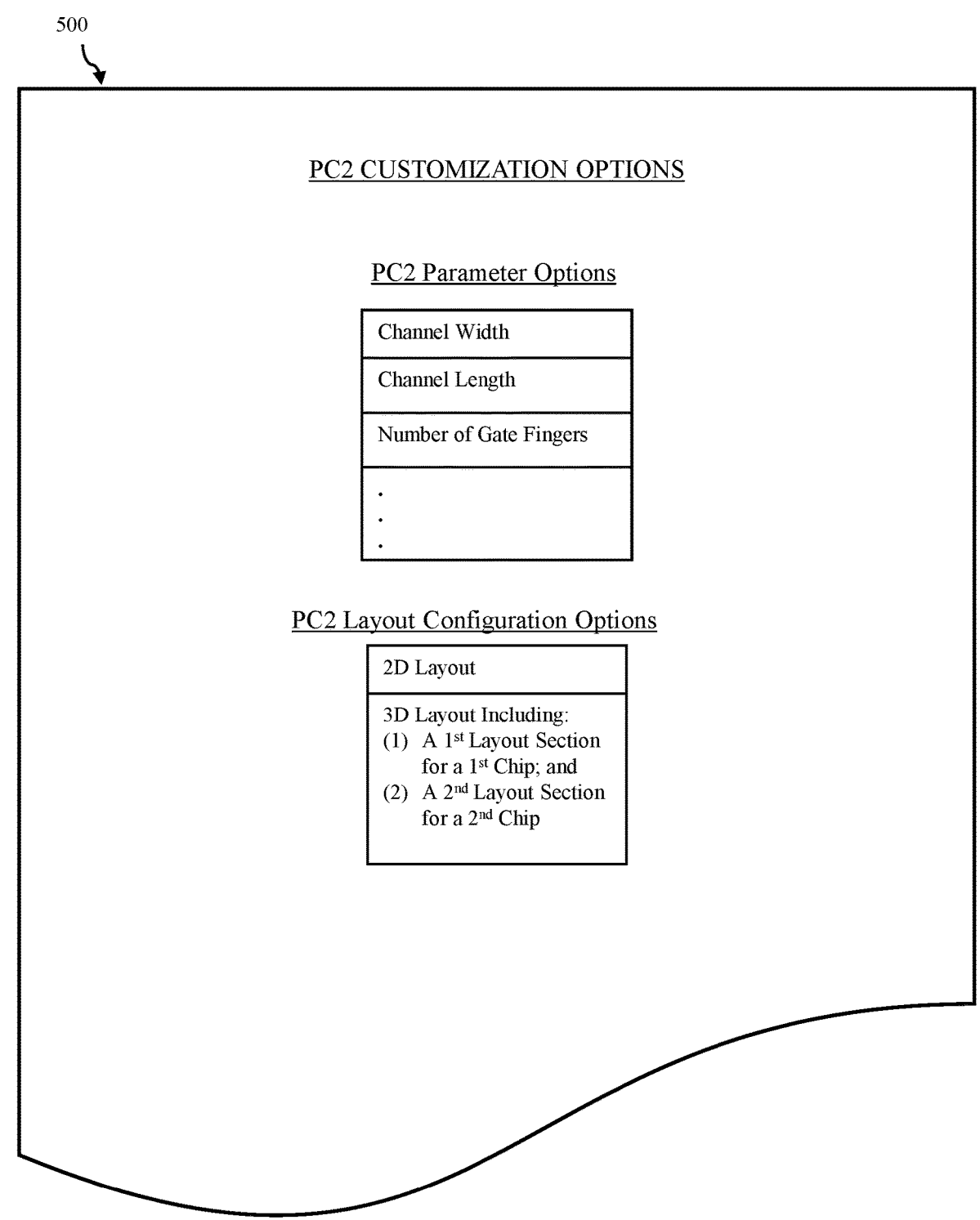

FIG. 5 is an exemplary screenshot 500 from an exemplary GUI following selection of PC2, which represents a specific type of RF switch (e.g., that includes a stack of series-connected FETs with corresponding gate fingers connected to a common gate node) and which is identified by some identifier (e.g., a number, name, etc.). The variable geometric parameters can include, but are not limited to, the number of stacked FETs (and thereby the number of gate fingers), channel width, channel length, etc. Therefore, if multiple instances of the same RF switch PC2 are inserted into the layout for an IC design, different instances may have different numbers of stacked FETs (i.e., different numbers of gate fingers) and/or different combinations of channel length and/or channel width.

Figure 6:
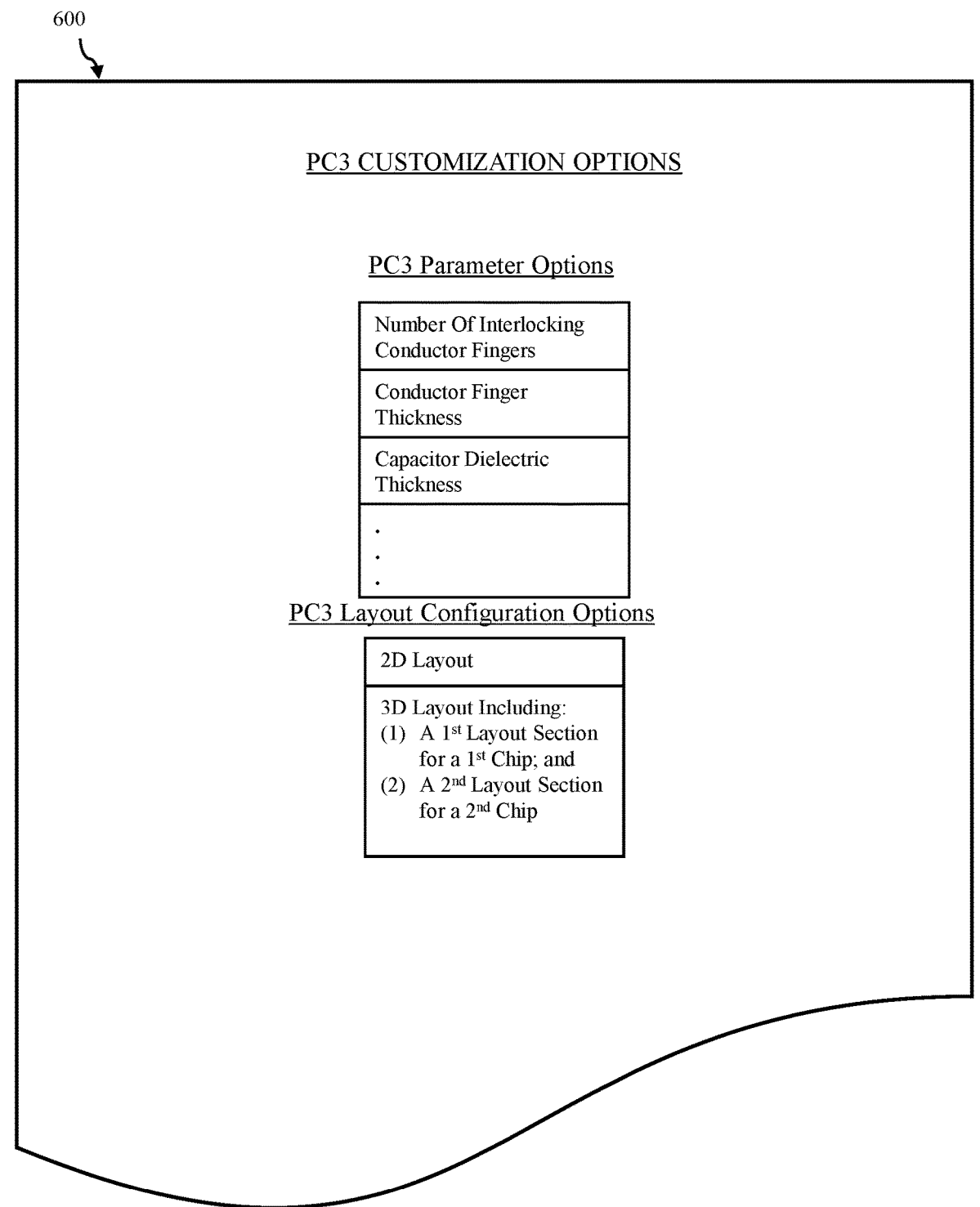

FIG. 6 is an exemplary screenshot 600 from an exemplary GUI following selection of PC3, which represents a specific type of multi-finger capacitor (also referred to herein as an interdigitated capacitor) (e.g., that includes two conductive plates having interlocking conductor extensions (also known as conductor fingers) separated by a capacitor dielectric) and which is identified by some identifier (e.g., a number, name, etc.). The variable geometric parameters can include, but are not limited to, the number of interlocking conductor fingers extending from each plate, the conductor finger thickness, the capacitor dielectric thickness (i.e., separation distance between adjacent conductor fingers extending from different conductive plates), etc. Therefore, if multiple instances of the same multi-finger capacitor PC3 are inserted into the layout for an IC design, different instances may have different numbers of conductor and/or different combinations of conductor finger thickness and/or dielectric thickness.

Figure 7:
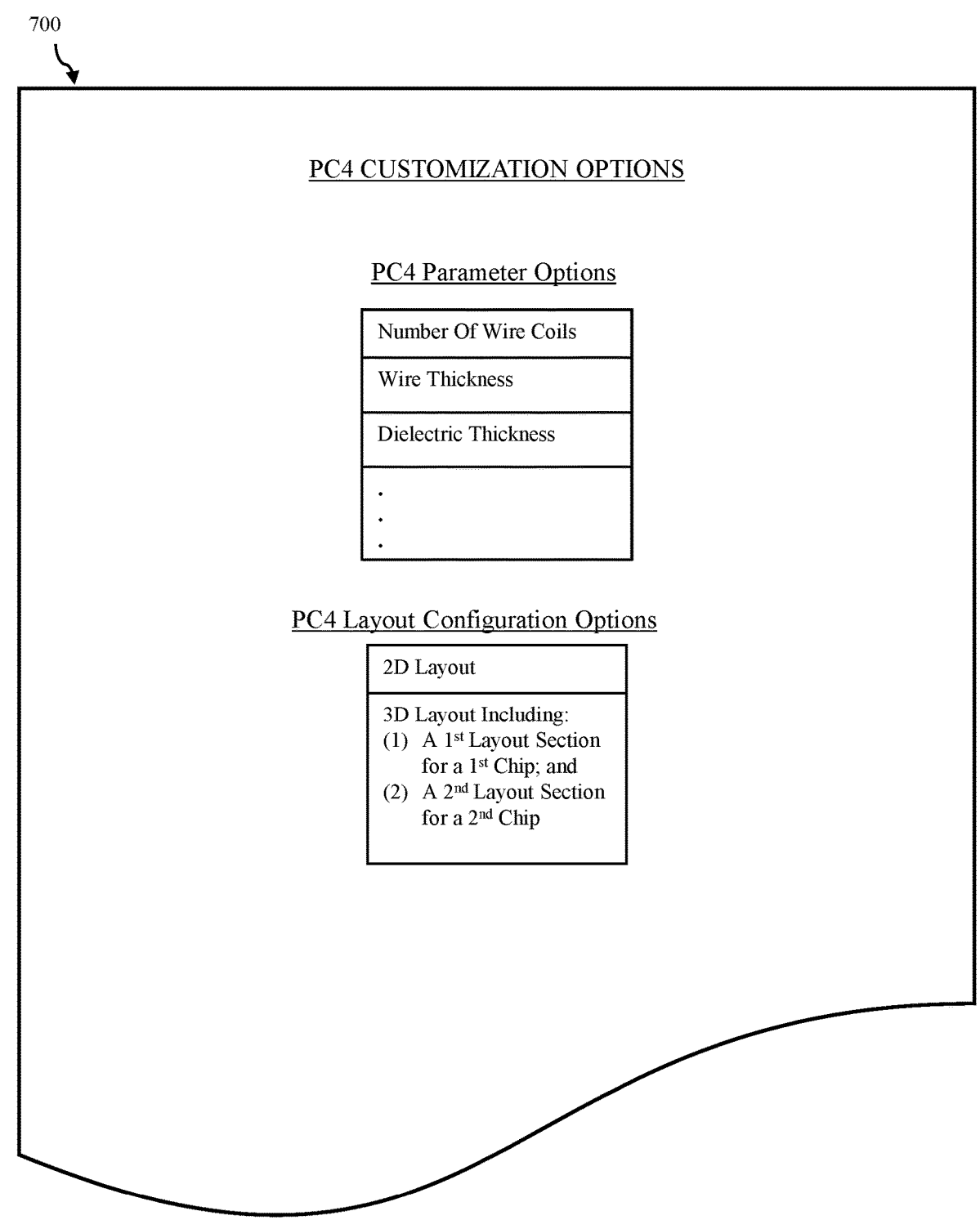

FIG. 7 is another exemplary screenshot 700 from another exemplary GUI following selection of PC4, which represents a specific type of inductor (e.g., that includes multiple wire coils) and which is identified by some identifier (e.g., a number, name, etc.). The variable geometric parameters can include, but are not limited to, the number of wire coils, wire thickness, dielectric thickness (i.e., wire separation distance), etc. Therefore, if multiple instances of the same inductor PC4 are inserted into the layout for an IC design, different instances may have different numbers of wire coils and/or different combinations of wire thickness and/or dielectric thickness.

Figure 8:
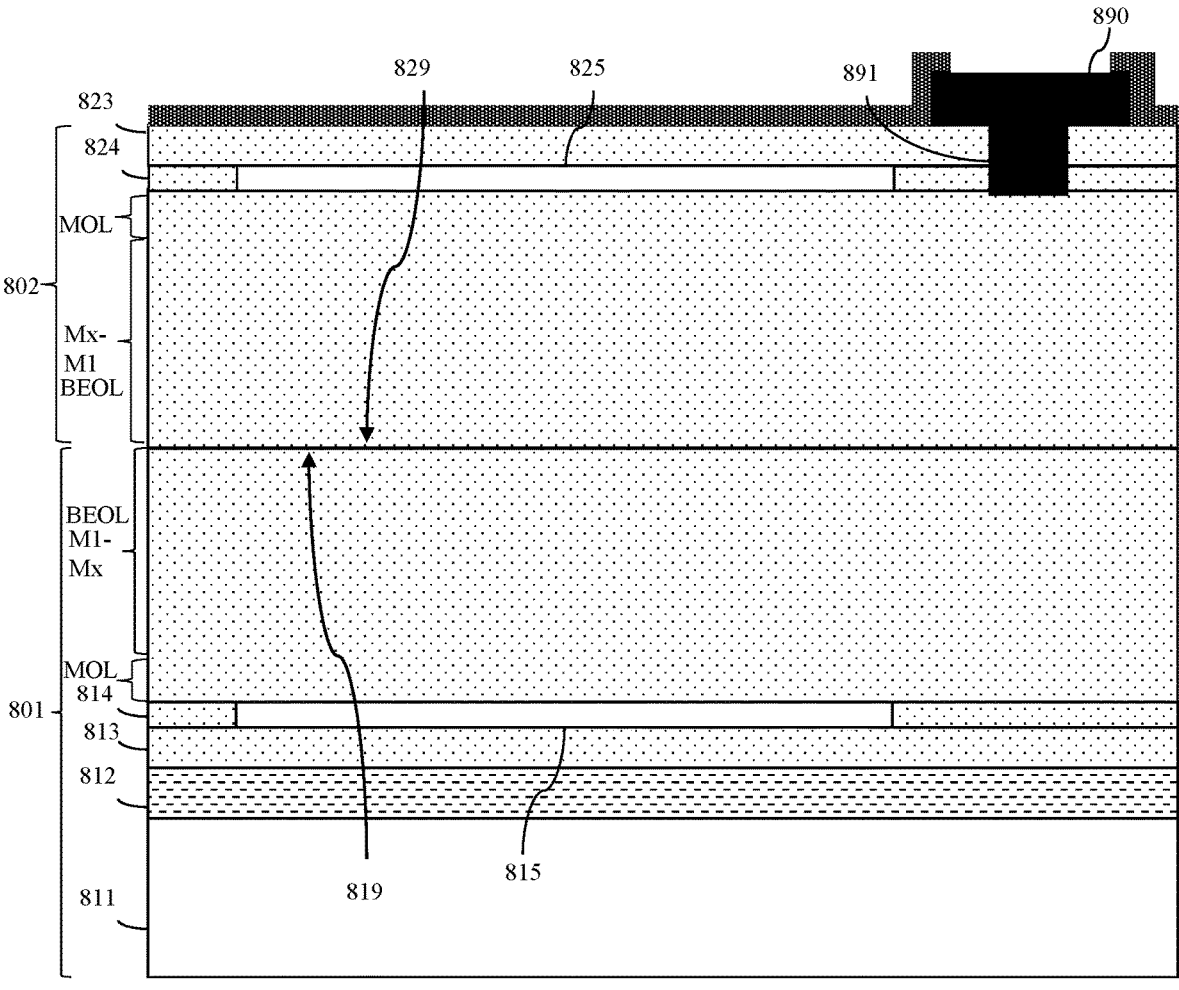
FIG. 8 is a cross-section diagram illustrative of a base 3D IC structure.

Additionally, as mentioned above, 2D area of an IC under design can be reduced by converting the IC from a 2D IC to a 3D IC. For example, FIG. 8 is a cross-section diagram illustrating a base 3D IC structure in an RF SOI technology node. This RF SOI 3D IC structure can include a first chip 801 and a second chip 802, which are both SOI chips.

The first chip 801 can include a semiconductor substrate 811 (e.g., a high resistance silicon substrate) and a trap rich polysilicon layer 812 at the top of the silicon substrate 811. The first chip 801 can further include a first insulator layer 813 (e.g., a silicon dioxide layer) on the semiconductor substrate (e.g., adjacent to the trap rich polysilicon layer 812). The first chip 801 can further include a first active device layer (e.g., a monocrystalline semiconductor layer, such as a monocrystalline silicon layer or some other suitable monocrystalline semiconductor layer) on the first insulator layer 813. First shallow trench isolation (STI) regions 814 can extend through the first active device layer to the insulator layer 813 and can, for example, define the boundaries of a first active device region 815. Such a first active device region 815 can include a first front end of the line (FEOL) device or devices. The first chip 801 can further include: one or more first middle of the line (MOL) dielectric layers over the first active device region 815; one or more first MOL contacts extending through the first MOL dielectric(s) (e.g., to first FEOL device(s)); and first back end of the line (BEOL) metal levels (M1-Mx) above the first MOL dielectric(s) and including first BEOL dielectric layers, wires and/or vias within the first BEOL dielectric layers, and a first dielectric surface 819 distal to the first active device layer. To avoid clutter in the FIG. 8, the first FEOL device(s), first MOL contacts, and first BEOL wires and vias of the first chip 801 are not shown.

The second chip 802 can include a second insulator layer 823 (e.g., a silicon dioxide layer) and a second active device layer (e.g., a monocrystalline semiconductor layer, such as a monocrystalline silicon layer or some other suitable monocrystalline semiconductor layer) on the second insulator layer 823. Second STI regions 824 can extend through the second active device layer to the second insulator layer 823 and can, for example, define the boundaries of a second active device region 825. Such a second active device region 825 can include a second front end of the line (FEOL) device or devices. The second chip 802 can further include: one or more second MOL dielectric layers over the second active device region 825; one or more second MOL contacts extending through the second MOL dielectric(s) (e.g., to second FEOL device(s)); and second BEOL metal levels (M1-Mx) above the second MOL dielectric(s) and including second BEOL dielectric layers, wires and/or vias within the second BEOL dielectric layers, and a second dielectric surface 829 distal to the second active device layer. To avoid clutter in the FIG. 8, the second FEOL device(s), second MOL contacts, and second BEOL wires and vias of the second chip 802 are not shown.

In any case, in such a base 3D IC structure, the second chip 802 can be flipped with respect to the first chip 801 such that the second dielectric surface 829 of the second chip 802 is immediately adjacent and bonded to the first dielectric surface 819 of the first chip 801. Combinations of wires and/or vias in the BEOL metal levels and MOL contacts of the two chips 801-802 enable electrical connections on the same chip and between chips. Additionally, input/output pad(s) 890 can be on the surface of the second insulator layer 823 of the second chip 802 opposite an STI region 824 and interconnect(s) 891 (e.g., vias) can extend from the input/output pad(s) 890 through the second insulator layer 823 and the STI region 824 to enable electrical connections between the input/output pads and other components on the first chip and/or second chip.

With automated design techniques for 3D ICs, the 3D IC layout will typically be divided into a first layout section for the first chip 801 and a second layout section for the second chip 802. Additionally, each instance of a pcell will typically be instantiated entirely in one of the two layout sections so as to be included on a corresponding one of chips following manufacture. However, in the disclosed embodiments, one or more of the pcells in the library 111 can represent IC components with multiple layout configuration options. Specifically, one or more of the pcells can include a customization script including program instructions that allow, not only different parameter options to be selected (as discussed above), but also different layout configuration options to be selected. That is, for some pcells, the IC component represented by the pcell can have multiple layout configuration options, including, for example, a single-chip layout configuration option and a multi-chip layout configuration option. Selection of the single-chip layout configuration option will cause the customized instance of the pcell to be instantiated entirely in the first layout section for the first chip 801 or the second layout section for the second chip 802. Selecting the multi-chip layout configuration option will cause the customized instance of the pcell to be divided into portions (e.g., symmetric portions) with a first portion instantiated in the first layout section for the first chip 801 and with a second portion instantiated in the second layout section for the second chip 802. Thus, for example, while the FET pcell (PC1) may provide only a single-chip configuration option, other pcells (RF switch PC2, multi-finger capacitor PC3, inductor PC4, etc.) could have selectable single-chip and multi-chip layout configuration options and inputs received at process 201 can also indicate a selected layout configuration.

Referring again to the flow diagram of FIG. 2, optionally, the design method can include performing (e.g., by a processor 150 executing a simulation tool) a pre-layout simulation of the 3D IC under design (e.g., SPICE) (see process 202). Results of the simulation can be analyzed to determine, for example, if performance requirements, etc. are met. If not, process 201 can be repeated (e.g., replacing cells, changing cell parameter values, etc.). If so, physical design can be performed (e.g., by one or more processors 150 executing one or more of the EDA tools) based on the low-level description (see process 204).

Physical design at process 204 can include, but is not limited to: floorplanning, partitioning; power planning; placement, clock tree synthesis, signal routing, timing closure, etc. Generally, physical design steps are known in the art and, thus, the details thereof (except for those specifically related to pcell placement and layout customization) have been omitted from this specification to allow the reader to focus on the salient aspects of the disclosed embodiments. That is, in additional to the physical design steps mentioned above and known in the art, physical design in the disclosed design method can also include pcell placement according to a layout configuration option selected at process 201, if applicable.

Figure 9:
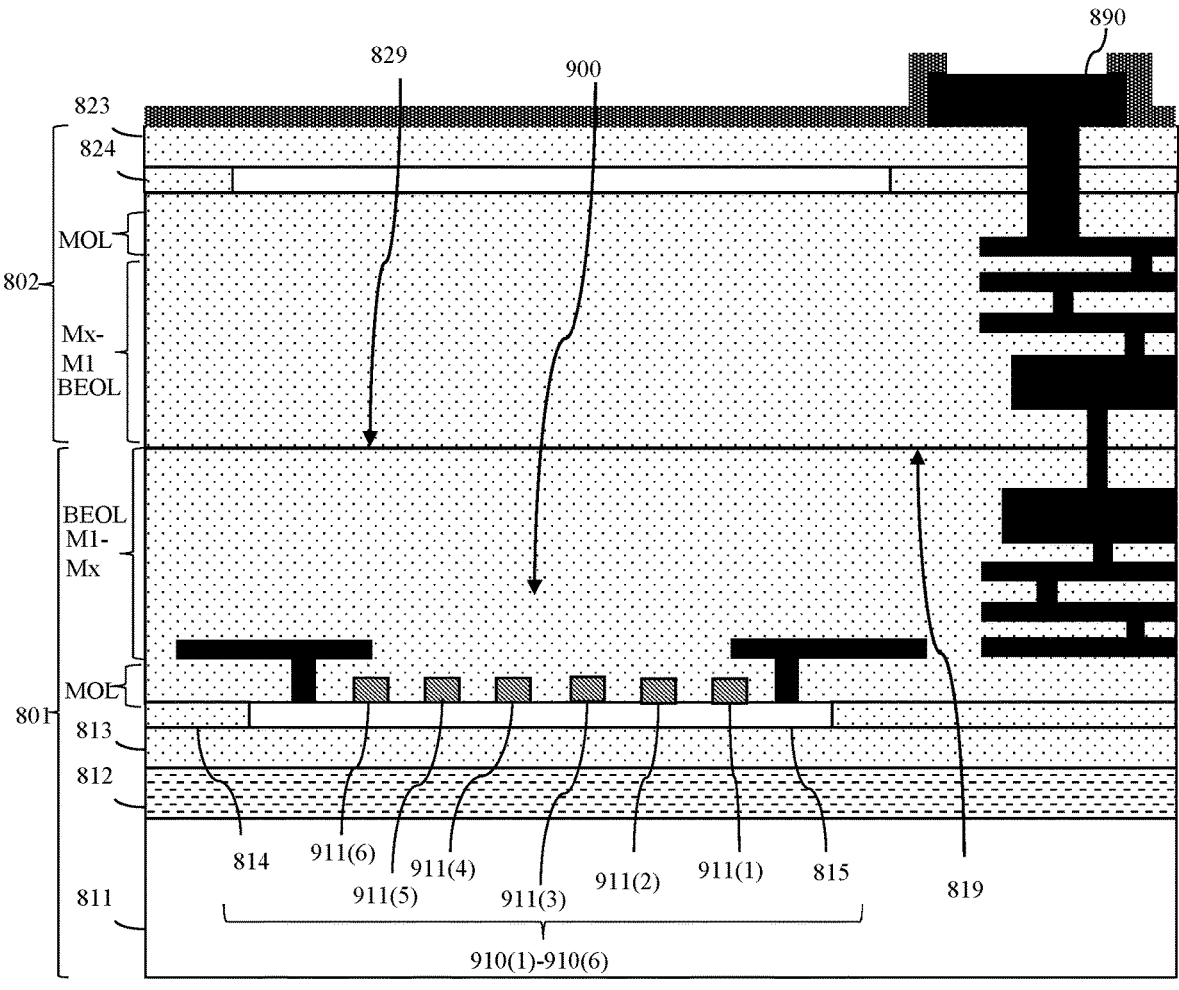
FIG. 9 is a cross-section diagram illustrative of a 3D IC structure, as shown in FIG. 8, and further including a customized instance an RF switch pcell entirely in one layout section for one chip.

For example, when inputs (e.g., user inputs or automatic inputs) received by a processor 150 indicate selection of a specific pcell and selection of a single-chip configuration layout option, the customization script can, in response to the inputs, cause the processor 150 to place a customized instance of the pcell at issue entirely in either the first layout section for the first chip 801 or the second layout section for the second chip 802. For example, when inputs specific to an RF switch pcell (e.g., PC2) are received by a processor 150 and include an input indicating that the number of stacked FETs and corresponding gate fingers is six and another input indicating selection of the single-chip layout configuration option, the customization script of the RF switch pcell can, in response to the inputs, cause the processor 150 to place a customized instance 900 of the RF switch pcell including six stacked FETs 910-(1)-910(6), which have six corresponding gate fingers 911(1)-911(6) connected to a common gate node (not shown), entirely in one of the two layout sections (e.g., in the first layout section for the first chip 801), as illustrated in FIG. 9.

Figure 10:
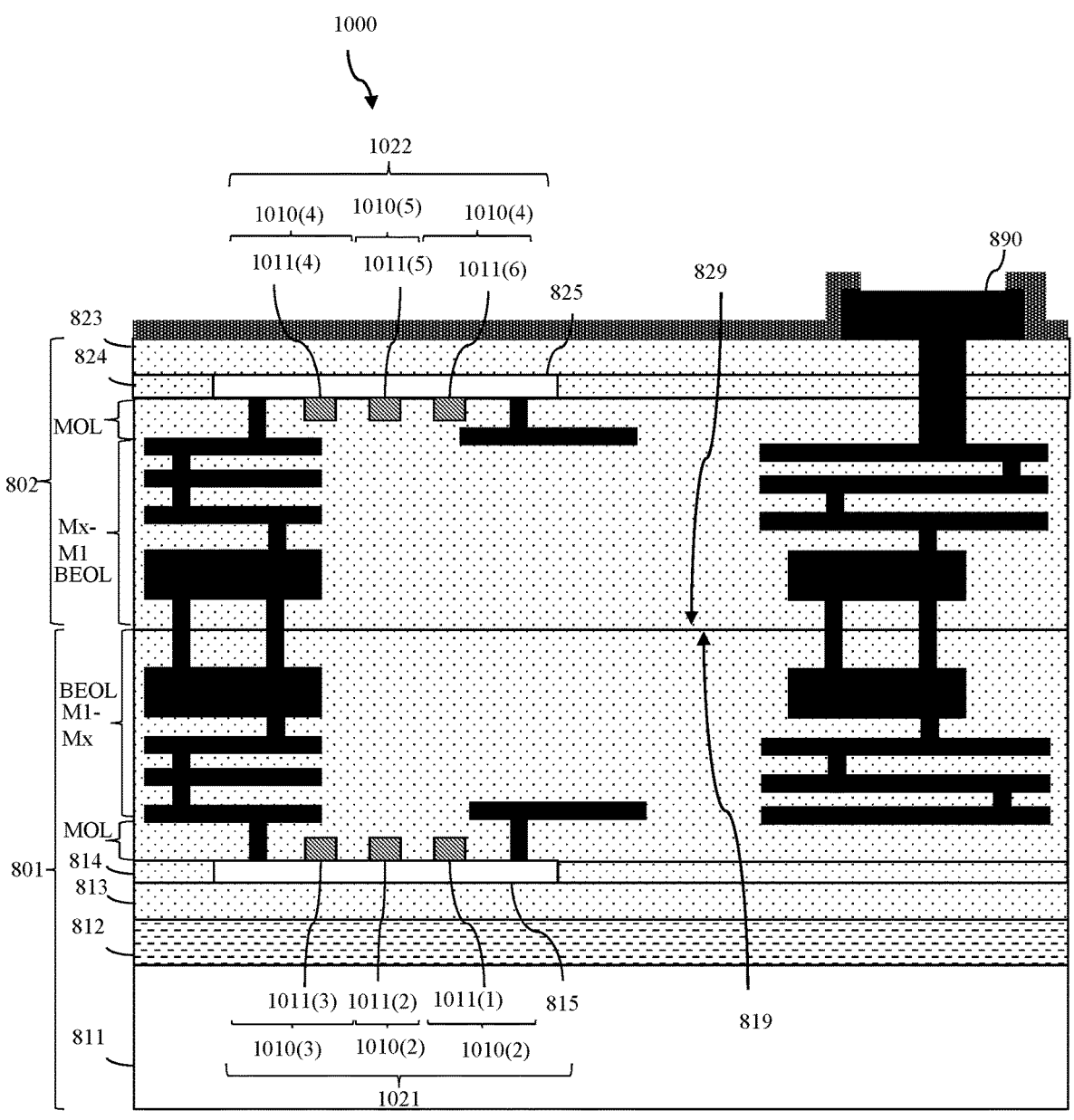
FIG. 10 is a cross-section diagram illustrative of a 3D IC structure, as shown in FIG. 8, and further including a customized instance of an RF switch pcell split between two layout sections for two chips, respectively.

However, when inputs (e.g., user inputs or automatic inputs) received by a processor 150 indicate selection of a specific pcell and selection of a multi-chip configuration layout option, the customization script can, in response to the inputs, cause the processor 150 to place a first portion of a customized instance of the pcell in the first layout section for the first chip 801 and a second portion of the customized instance of the pcell in the second layout section for the second chip 802. Optionally, these two portions can be symmetric and will be vertically aligned within the 3D IC. For example, when inputs specific to an RF switch pcell (e.g., PC2) are received by a processor 150 and include an input indicating that the number of stacked FETs and corresponding gate fingers is six and another input indicating selection of the multi-chip layout configuration option, the customization script of the RF switch PC2 can, in response to the inputs, cause the processor 150 to place a first portion 1021 of a customized instance 1000 of the RF switch pcell having three stacked FETs 1010(1)-1010(3) with corresponding three gate fingers 1011(1)-1011(3) connected to a common gate node (not shown) in the first layout section for the first chip 801 and to further place a second portion 1022 of the customized instance 1000 of the RF switch PC2 having three additional stacked FETs 1010(4)-1010(6) with corresponding gate fingers 1011(4)-1011(6) connected to an additional common gate node (not shown) in the second layout section for the second chip 802 so that within the 3D IC the second portion 1022 is essentially symmetrical with and aligned above the first portion 1021, as illustrated in FIG. 10.

It should also be noted that, when inputs (e.g., user inputs or automatic inputs) indicate selection of a specific pcell and selection of a multi-chip configuration layout option, the customization script can further, in response to the inputs, specifically cause the processor 150 to include routing for first interconnects (e.g., wires and/or vias) in the first BEOL metals of the first chip 801 in the first layout section and routing for second interconnects (e.g., wires and/or vias) in the second BEOL levels of the second chip 802 in the second layout section to electrically connect the first portion and the second portion, as necessary, at a bonded interface between the first dielectric surface 819 and the second dielectric surface 829 to form the desired IC component. For example, since the six stacked FETs of the customized instance 1000 of the RF switch pcell shown in FIG. 10 are divided between the two layout sections for the two chips, respectively, routing, including first interconnects in the first layout section and second interconnects in the second layout section, can be included to ensure that the three stacked FETs 1010(1)-1010(3) on the first chip 801 will be electrically connected in series with the three stacked FETs 1010(4)-1010(6) on the second chip 802 (e.g., as illustrated) and to further ensure that the common gate node for the FETs 1010(1)-1010(3) is also electrically connected to the additional common gate node for the FETs 1010(4)-1010(6).

In the example provided above the multi-chip layout configuration option reduces the two-dimensional area required for the RF switch. It should be noted that this example is not intended to be limiting. Other pcells (e.g., a multi-finger capacitor pcell, an inductor pcell, etc.) could similarly be parameter-customizable and layout configuration-customizable such that a customized instance of the pcell can include a first portion placed in a first layout section for a first chip and a second portion placed in a second layout section for a second chip such that, when the chips are stacked, the second portion is aligned above and essentially symmetrical with the first portion in order to reduce area consumption.

Referring to the flow diagram of FIG. 2, physical design at process 204 includes generation and output of a 3D IC layout 130, which includes both a first layout section 131 for a first chip of the 3D IC and a second layout section 132 for a second chip of the 3D IC. In addition, the first layout section 131 and the second layout section 132 can also be separately generated and output (see processes 206a and 206b). The 3D IC layout 130 and each layout section 131-132 thereof can be generated and output in a binary database file format (e.g., GDS, GDSII, OASIS or any other binary database file format) that represents geometric shapes, text labels, and other information about a layout and that is a standard used for electronic design automation (EDA) data exchange. The 3D IC layout 130 and the layout sections 131-132 can be stored in memory (e.g., 102(2)).

The design method can further include performing (e.g., by the processor 150 executing an LVS tool) an LVS check on the 3D IC layout 130 (see process 208). If the 3D IC layout 130 does not match the schematic (e.g., from process

201), then process 204 (along with processes 206a-206b) can be repeated. If the 3D IC layout 130 does match the schematic, the design method can further include performing (e.g., by a processor 150 executing a PEX tool) parasitic extraction on each layout section 131-132 (see processes 212a and 212b).

The design method can further include merging (e.g., by the processor 150) the results of PEX (see process 213) and performing (e.g., by the processor 150 executing a simulation tool) a post-layout simulation (see process 214). Analyzing results of the post-layout simulation can be performed to determine, for example, if performance requirements, etc. are met. If not, process 204 can be repeated. If so, additional iterative design processing can be performed (e.g., by a processor 150 executing additional EDA tools) with respect to each of the layout sections 131-132, individually, to generate finalized first and second layout sections 141-142 (see processes 218a and 218b). The additional iterative design processing can include, but is not limited to, an electromigration and voltage (EMIR) drop analysis, topography control (e.g., chemical mechanical planarization (CMP) simulation and dummy fill shape insertion for topography control), design rule checking (DRC), etc. The finalized first and second layout sections 141-142 can be stored (e.g., in memory 102(2)) and further released to manufacturing (e.g., see processes 220a-220b).

Figure 11:
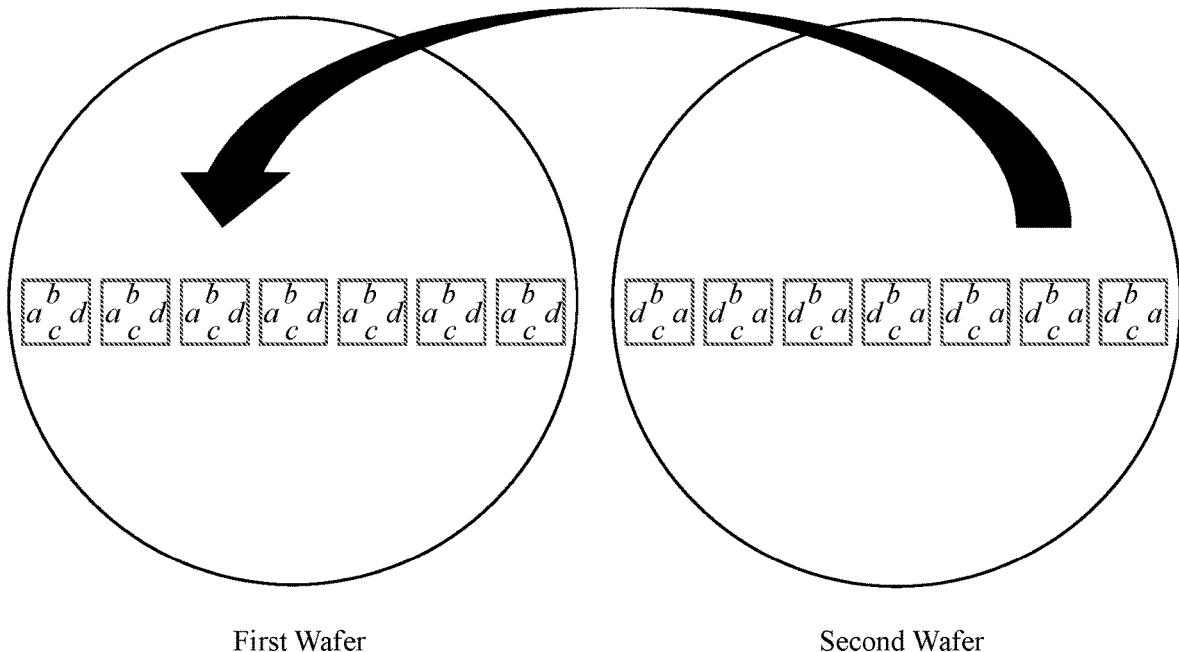
FIG. 11 is a diagram illustrating layout of first chips on a first wafer and of second chips on a second wafer to facilitate proper alignment of each first chip-second chip pair for a 3D IC following wafer bonding.

As illustrated in FIG. 11, multiple first chips can be manufactured on a first SOI wafer according to the finalized first layout section 141 and multiple second chips can be manufactured on a second SOI wafer at identical locations according to the finalized second layout section 142. It should be understood that each layout section will have a first side a, a second side d opposite the first side, a top b, and a bottom c opposite the top. However, the orientations of the sides a and d in the first layout section will be different from those in the second layout section. For example, sides a and d in first layout section will the left and right sides, respectively, whereas sides a and d in the second layout section will be the right and left sides, respectively. Thus, following manufacturing, when the second SOI wafer is flipped with respect to the first SOI wafer and the outermost dielectric surfaces thereof are bonded together, each second chip is properly aligned over a corresponding first chip and with the required electrical connections (e.g., between a first portion and a second portion of a customized instance of a pcell) being made. Then, the semiconductor substrate of the second SOI wafer can be removed, dicing can be performed, etc.

The disclosed embodiments may be implemented as a system, a method, and/or a computer program product (e.g., a PDK product). The computer program product may include a computer readable storage medium (or media) having computer readable program instructions thereon for causing a processor to carry out aspects of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosed embodiments.

Aspects of the disclosed embodiments are described herein with reference to flowchart illustrations and/or block diagrams of methods, apparatus (systems), and computer program products according to the disclosed embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various disclosed embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
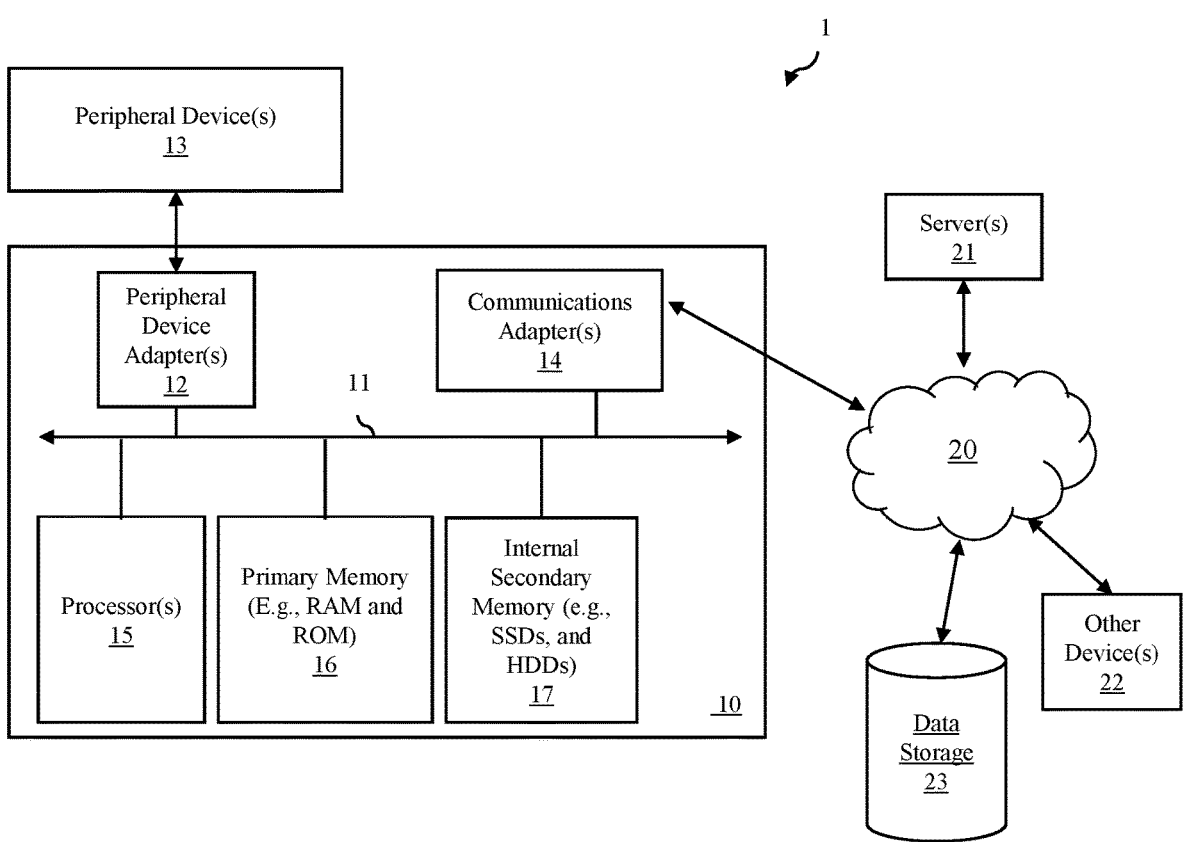
FIG. 12 is a schematic diagram illustrative of a hardware environment for implementing aspects of the disclosed embodiments.

An illustrative hardware environment 1 for implementing aspects of the disclosed systems, methods, and computer program products (e.g., PDK products) is depicted in FIG. 12. Generally, the hardware environment 1 can include at least one computing device 10 (also referred to herein as a computer). The computer 10 can be, for example, a desktop, laptop, tablet, mobile computing device, etc. The computer 10 can include at least one bus 11. The bus 11 can be connected to various other components of the computer 10 and can be configured to facilitate communication between those components.

The computer 10 can include various adapters. The adapters can include one or more peripheral device adapters 12, which are configured to facilitate communications between one or more peripheral devices 13, respectively, and the bus 11. The peripheral devices 13 can include user input devices configured to receive user inputs. User input devices can include, but are not limited to, a keyboard, a mouse, a microphone, a touchpad, a touchscreen, a stylus, biosensor, a scanner, or any other type of user input device. The peripheral devices 13 can also include additional input devices, such as external secondary memory devices (as discussed in greater detail below). The peripheral devices 13 can also include output devices. The output devices can include, but are not limited to, a printer, a monitor, a speaker, or any other type of computer output device. The adapters can include one or more communications adapters 14 (also referred to herein as a computer network adapters), which are configured to facilitate communications between the computer 10 and one or more communications networks 20 (e.g., a wide area network (WAN), a local area network (LAN), the internet, a cellular network, a wifi network, etc.). Such network(s) 20 can, in turn, facilitate communications between the computer 10 and other system components on the network: remote server(s) 21, other device(s) 22 (e.g., computers, laptops, tablets, mobile phones, etc.), remote data storage 23, etc.

The computer 10 can further include at least one processor 15 (also referred to herein as a central processing units (CPU)). Optionally, each CPU 15 can include a CPU cache. Each CPU 15 can be configured to read and execute program instructions.

The computer 10 can further include memory and, particularly, computer-readable storage mediums. The memory can include primary memory 16 and secondary memory. The primary memory 16 can include, but is not limited to, random access memory (RAM) (e.g., volatile memory employed during execution of program operations) and read only memory (ROM) (e.g., non-volatile memory employed during start-up). The RAM can include, but is not limited to, dynamic random access memory (DRAM), static random access memory (SRAM), or any other suitable type of RAM. The ROM can include, but is not limited to, erasable programmable read only memory (EPROM), flash memory, electronically erasable programmable read only memory (EEPROM), programmable read only memory (PROM), or any other suitable type of ROM. The secondary memory can be non-volatile. The secondary memory can include internal secondary memory 17, such as internal solid state drive(s) (SSD(s)) and/or internal hard disk drive(s) (HDD(s)), installed within the computer 10 and connected to the bus 11. The secondary memory can also include external secondary memory connected to or otherwise in communication with the computer 10 (e.g., peripheral devices). The external secondary memory can include, for example, external/portable SSD(s), external/portable HDD(s), flash drive(s), thumb drives, compact disc(s) (CD(s)), digital video disc(s) (DVD(s)), network-attached storage (NAS), storage area network (SAN), or any other suitable non-transitory computer-readable storage medium connected to or otherwise in communication with the computer 10. The different functions of primary and secondary memory are well known in the art and, thus, the details thereof have been omitted from this specification in order to allow the reader to focus on the salient aspects of the disclosed embodiments.

In some embodiments, program instructions for performing the disclosed method or a portion thereof, as described above, can be embodied in (e.g., stored in) secondary memory accessible by the computer 10. When the program instructions are to be executed (e.g., in response to user inputs to the computer 10), required information (e.g., the program instructions and other data) can be loaded into the primary memory (e.g., stored in RAM). The CPU 15 can read the program instructions and other data from the RAM and can execute the program instructions. In other embodiments, a client-server model can be employed. In this case, the computer 10 can be a client and a remote server 21 in communication with the computer 10 over a network 20 can provide, to the client, a service including execution of program instructions for performing the disclosed method or a portion thereof, as described above, in response to user inputs the computer 10.

It should be understood that the terminology used herein is for the purpose of describing the disclosed structures and methods and is not intended to be limiting. For example, as used herein, the singular forms "a," "an" and "the" are intended to include the plural forms as well, unless the context clearly indicates otherwise. Additionally, as used herein, the terms "comprises," "comprising," "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right," "left," "vertical," "horizontal," "top," "bottom," "upper," "lower," "under," "below," "underlying," "over," "overlying," "parallel," "perpendicular," etc., are intended to describe relative locations as they are oriented and illustrated in the drawings (unless otherwise indicated) and terms such as "touching," "in direct contact," "abutting," "directly adjacent to," "immediately adjacent to," etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various disclosed embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a non-transitory computer-readable storage medium storing a library of cells; and
   a processor in communication with the non-transitory computer-readable storage medium,
   wherein the cells in the library include parameterized cells,
   wherein the parameterized cells include a specific parameterized cell representing a specific circuit component with multiple layout configuration options including a single-chip layout configuration option and a multi-chip layout configuration option, and
   wherein, in response to inputs specific to the specific parameterized cell and received by the processor, the processor places an instance of the specific parameterized cell in a layout for a three-dimensional integrated circuit according to one of the multiple layout configuration options.

2. The system of claim 1, wherein the layout for the three-dimensional integrated circuit includes:

a first layout section for a first chip, wherein the first chip includes a first device layer and first metal levels on the first device layer, and wherein the first metal levels have a first outermost dielectric surface distal to the first device layer; and a second layout section for a second chip, wherein the second chip includes a second device layer; and second metal levels on the second device layer, and wherein the second metal levels have a second outermost dielectric surface distal to the second device layer and wherein the first outermost dielectric surface is bonded to the second outermost dielectric surface.

3. The system of claim 2, wherein the processor generates the first layout section and subjects the first layout section to additional iterative design processing, wherein the processor generates the second layout section and subjects the second layout section to the additional iterative design processing, wherein the additional iterative design processing includes at least parasitic extraction, electromigration and voltage drop analysis, and design rule checking, and wherein, following the additional iterative design processing on the first layout section and the second layout section, the processor outputs a finalized first layout section for manufacturing first chips on a first semiconductor wafer and outputs a finalized second layout section for manufacturing second chips on a second semiconductor wafer.

4. The system of claim 2, wherein, when the inputs indicate the single-chip layout configuration option for the specific parameterized cell, the processor places the instance of the specific parameterized cell entirely in one of the first layout section and the second layout section.

5. The system of claim 2, wherein, when the inputs indicate the multi-chip layout configuration option for the specific parameterized cell, the processor places a first portion of the instance of the specific parameterized cell in the first layout section and a second portion of the instance of the specific parameterized cell in the second layout section.

6. The system of claim 5, wherein the first portion and the second portion are symmetric portions.

7. The system of claim 5, wherein, when the inputs indicate the multi-chip layout configuration option for the specific parameterized cell, the processor includes, in the first layout section and in the second layout section, routing information for first interconnects in the first metal levels and for second interconnects in the second metal levels, respectively, to electrically connect the first portion and the second portion at an interface between the first outermost dielectric surface and the second outermost dielectric surface.

8. The system of claim 1, wherein the circuit component includes any of a radio frequency switch, a multi-finger capacitor, and an inductor.

9. A method comprising:

receiving, by a processor, inputs specific to a specific parameterized cell of multiple parameterized cells in a library of cells, wherein the specific parameterized cell represents a specific circuit component with multiple layout configuration options including a single-chip layout configuration option and a multi-chip layout configuration option; and in response to the inputs, placing, by the processor, an instance of the specific parameterized cell in a layout for a three-dimensional integrated circuit according to one of the multiple layout configuration options.

10. The method of claim 9, wherein the layout for the three-dimensional integrated circuit includes:

a first layout section for a first chip, wherein the first chip includes a first device layer and first metal levels on the first device layer, and wherein the first metal levels have a first outermost dielectric surface distal to the first device layer; and a second layout section for a second chip, wherein the second chip includes a second device layer; and second metal levels on the second device layer, and wherein the second metal levels have a second outermost dielectric surface distal to the second device layer and wherein the first outermost dielectric surface is bonded to the second outermost dielectric surface.

11. The method of claim 10, further comprising:

generating, by the processor, the first layout section and the second layout section;

subjecting, by the processor, the first layout section to additional iterative design processing and the second layout section to the additional iterative design processing, wherein the additional iterative design processing includes parasitic extraction, electromigration and voltage drop analysis, and design rule checking; and outputting, by the processor, a finalized first layout section for manufacturing first chips on a first semiconductor wafer and a finalized second layout section for manufacturing second chips on a second wafer.

12. The method of claim 10, wherein the placing includes, when the inputs indicate the single-chip layout configuration option for the specific parameterized cell, placing the instance of the specific parameterized cell in one of the first layout section and the second layout section.

13. The method of claim 10, wherein the placing includes, when the inputs indicate the multi-chip layout configuration option for the specific parameterized cell, placing a first portion of the instance of the specific parameterized cell in the first layout section and placing a second portion of the instance of the specific parameterized cell in the second layout section.

14. The method of claim 13, wherein the first portion and the second portion are symmetric portions.

15. The method of claim 13, further comprising, when the inputs indicate the multi-chip layout configuration option, including, by the processor, routing information for first interconnects in the first metal levels of the first layout section and for second interconnects in the second metal levels of the second layout section to electrically connect the first portion and the second portion at an interface between the first outermost dielectric surface and the second outermost dielectric surface.

16. The method of claim 9, wherein the circuit component includes any of a radio frequency switch, a multi-finger capacitor, and an inductor.

17. A product comprising:

a non-transitory computer-readable storage medium; and a library of cells including parameterized cells stored on the non-transitory computer-readable storage medium, wherein a specific parameterized cell of the parameterized cells represents a specific circuit component with multiple layout configuration options including a single-chip layout configuration option and a multi-chip layout configuration option, wherein the specific parameterized cell includes a customization script, and wherein the customization script is executable by a processor to cause the processor to perform a method including, in response to inputs that are received by the processor and specific to the specific parameterized cell, placing an instance of the specific parameterized cell in a layout for a three-dimensional integrated circuit according to one of the multiple layout configuration options.

18. The product of claim 17, wherein the layout for the three-dimensional integrated circuit includes:

a first layout section for a first chip, wherein the first chip includes a first device layer and first metal levels on the first device layer, and wherein the first metal levels have a first outermost dielectric surface distal to the first device layer; and a second layout section for a second chip, wherein the second chip includes a second device layer; and second metal levels on the second device layer, and wherein the second metal levels have a second outermost dielectric surface distal to the second device layer and wherein the first outermost dielectric surface is bonded to the second outermost dielectric surface.

19. The product of claim 18, wherein the placing includes:

when the inputs indicate the single-chip layout configuration option for the specific parameterized cell, placing the instance of the specific parameterized cell entirely in one of the first layout section and the second layout section, and when the inputs indicate the multi-chip layout configuration option for the specific parameterized cell, placing a first portion of the instance of the specific parameterized cell in the first layout section and a second portion of the instance of the specific parameterized cell in the second layout section, and wherein the method further includes, when the inputs indicate the multi-chip layout configuration option for the specific parameterized cell, further including, in the first layout section and the second layout section, routing information for first interconnects in the first metal levels and for second interconnects in the second metal levels, respectively, to electrically connect the first portion and the second portion at an interface between the first outermost dielectric surface and the second outermost dielectric surface.

20. The product of claim 17, wherein the circuit component includes any of a radio frequency switch, a multi-finger capacitor, and an inductor.

\* \* \* \* \*